United States Patent
Inoue

(10) Patent No.: US 8,201,222 B2
(45) Date of Patent: Jun. 12, 2012

(54) AUTHENTICATION SYSTEM FOR AUTHENTICATING COMMUNICATION TERMINAL

(75) Inventor: Seiichi Inoue, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 1065 days.

(21) Appl. No.: 11/390,079

(22) Filed: Mar. 28, 2006

(65) Prior Publication Data

US 2006/0225129 A1 Oct. 5, 2006

(30) Foreign Application Priority Data

Mar. 31, 2005 (JP) ................................ 2005-101936

(51) Int. Cl.
*H04L 9/00* (2006.01)
(52) U.S. Cl. .............................................. 726/4; 726/3
(58) Field of Classification Search .................. 380/200, 380/30; 713/192, 168, 182; 726/4, 13, 30, 726/24; 709/12, 14
See application file for complete search history.

(56) References Cited

U.S. PATENT DOCUMENTS

| | | | |
|---|---|---|---|
| 6,421,782 B1 | 7/2002 | Yanagisawa et al. | |
| 7,350,077 B2 * | 3/2008 | Meier et al. | 713/171 |
| 7,434,258 B2 * | 10/2008 | Bajko et al. | 726/21 |
| 2006/0168198 A1 * | 7/2006 | Yang et al. | 709/224 |
| 2007/0008937 A1 * | 1/2007 | Mody et al. | 370/338 |
| 2007/0230453 A1 * | 10/2007 | Giaretta et al. | 370/389 |
| 2007/0280207 A1 * | 12/2007 | Shimizu et al. | 370/353 |
| 2007/0289011 A1 * | 12/2007 | Heath et al. | 726/16 |

FOREIGN PATENT DOCUMENTS

| | | |
|---|---|---|
| JP | 11-085326 | 3/1999 |
| JP | 2002-044177 | 2/2002 |
| JP | 2003-224577 | 8/2003 |
| JP | 2003-259417 | 9/2003 |

* cited by examiner

*Primary Examiner* — Vivek Srivastava
*Assistant Examiner* — Nega Woldemariam
(74) *Attorney, Agent, or Firm* — Foley & Lardner LLP

(57) ABSTRACT

An authentication system stops performing an authentication process on a communication terminal which is in an aborted state. The communication terminal can connect to a network when the authentication thereof is successful. The communication terminal changes between an operational state and an aborted state, and indicates a transition to the aborted state when the communication terminal changes from the operational state to the aborted state. An authentication device repeatedly performs the authentication process, counts a predetermined period for the communication terminal whose authentication has been successful, and performs the authentication process again on the communication terminal when the predetermined period elapses. When a transition to the aborted state is indicated by the communication terminal, the authentication device stops counting the predetermined period for the communication terminal and keeps the authentication of the communication terminal effective.

14 Claims, 9 Drawing Sheets

AUTHENTICATION SYSTEM FOR AUTHENTICATING COMMUNICATION TERMINAL

BACKGROUND OF THE INVENTION

1. Field of the Invention

The present invention relates to an authentication system for authenticating a supplicant to confirm the legitimacy of the supplicant, and more particularly to an authentication system for authenticating a supplicant again upon elapse of a predetermined period of time after the supplicant has first been authenticated.

2. Description of the Related Art

When a network is to be accessed, it is important for the network to have enhanced security, and the network performs an authentication process. For wireless LANs, standards such as IEEE802.1x, WPA (Wi-Fi Protected Access), and WPA2 have been established as user authentication/encryption processes. An authentication system based on those standards has been proposed in the art (see, for example, JP-A No. 2003-259417).

FIG. 1 of the accompanying drawings is a block diagram of a conventional authentication system. As shown in FIG. 1, the conventional authentication system has supplicant 90 and authenticator 91. Authenticator 91 can be connected to RADIUS server 92.

Supplicant 90 comprises a terminal used by a user, such as a wireless LAN terminal, for example. Supplicant 90 can connect to a network when it is authenticated by authenticator 91.

Authenticator 91 is an authenticating device such as a wireless LAN access point, and authenticates supplicant 90 serving as a terminal. It is assumed that authenticator 91 uses a RADIUS protocol for authentication, and operates as a RADIUS client. When accessed by supplicant 90, authenticator 91 exchanges authentication information with RADIUS server 92. If the authentication is successful, then authenticator 91 sends a successful authentication message to supplicant 90.

An authentication has an authenticate life time. After supplicant 90 is authenticated, authenticator 91 authenticates supplicant 90 repeatedly at given time intervals.

RADIUS server 92 performs an authentication process for supplicant 90 according to a request from authenticator 91. RADIUS server 92 uses a RADIUS protocol for authentication. When RADIUS server 92 receives a request from authenticator 91 which is a RADIUS client, RADIUS server 92 exchanges authentication information with authenticator 91, and determines whether the authentication is successful or not.

FIG. 2 of the accompanying drawings is a sequence diagram of operation of the conventional authentication system. As shown in FIG. 2, for a first authentication cycle, supplicant 90 sends EAPOL (PPP Extensible Authentication Protocol over Local Area Networks)-Start packet 901 to authenticator 91.

When authenticator 91 receives EAPOL-Start packet 901, authenticator 91 starts an authentication process, and sends EAP-Request packet 902 to supplicant 90. In response to EAP-Request packet 902, supplicant 90 sends EAP-response packet 903 to authenticator 91.

When authenticator 91 receives EAP-Response packet 903, authenticator 91 sends Access-Request packet 904 to RADIUS server 92, requesting RADIUS server 92 to authenticate supplicant 90. If the authentication subsequently proves to be successful through an authentication sequence, then RADIUS server 92 sends Access-Accept packet 905 indicative of the successful authentication to the authenticator 91.

When authenticator 91 receives Access-Accept packet 905, authenticator 91 sends EAP-Success packet 906 to supplicant 90, informing supplicant 90 of the successful authentication. Now, supplicant 90 can be connected to a network through authenticator 91.

At this time, authenticator 91 registers the account of supplicant 90 in an internal authentication table (not shown), and starts counting down a reauthentication timer (not shown) corresponding to the account. The reauthentication timer is a timer for counting up to an authentication time limit.

When a certain period of time elapses after the above authentication is successful, the reauthentication timer expires, i.e., the period of time in which the previous authentication is valid, or an authenticated period, elapses. Then, authenticator 91 initiates a reauthentication process. The reauthentication process is a process for reauthenticating supplicant 90 whose authentication period has elapsed. The reauthentication process will be described below.

When the reauthentication timer expires, autothenticator 91 recognizes that the authenticated period of supplicant 90 has elapsed. Authenticator 91 sends EAP-Request packet 907 to supplicant 90 whose authenticated period has elapsed.

When supplicant 90 receives EAP-Request packet 907, supplicant 90 sends EAPOL-Start packet 908 to autothenticator 91. Subsequently, the authentication system operates in the same manner as with the first authentication cycle.

In response to EAPOL-Start packet 908, autothenticator 91 starts an authentication process, and sends EAP-Request packet 909 to supplicant 90. In response to EAP-Request packet 909, supplicant 90 sends EAP-response packet 910 to authenticator 91.

When authenticator 91 receives EAP-Response packet 910, authenticator 91 sends Access-Request packet 911 to RADIUS server 92, requesting RADIUS server 92 to authenticate supplicant 90. If the authentication subsequently proves to be successful through an authentication sequence, then RADIUS server 92 sends Access-Accept packet 912 indicative of the successful authentication to the authenticator 91.

When authenticator 91 receives Access-Accept packet 912, authenticator 91 sends EAP-Success packet 913 to supplicant 90, informing supplicant 90 of the successful authentication. Now, supplicant 90 can be connected to the network through authenticator 91.

At this time, authenticator 91 reregisters the account of supplicant 90 or keeps the account of supplicant 90 registered in the internal authentication table, and resets and starts counting down the reauthentication timer corresponding to the account.

The same reauthentication process as described above is repeated each time the authenticated period elapses.

FIG. 3 of the accompanying drawings is a sequence diagram showing the first authentication cycle of the conventional authentication system. FIG. 3 shows in detail the authentication process that is performed by the exchange of packets 901 through 906 shown in FIG. 2. As shown in FIG. 3, the authentication process is started by the EAPOL-Start packet sent from supplicant 90 to authenticator 91 and the EAP-Request(Identity) sent from authenticator 91 to supplicant 90.

In the authentication process, Challenge packets are repeatedly sent from RADIUS server 92 to supplicant 90 and Message Digest packets are repeatedly sent from supplicant 90 to RADIUS server 92 as responses to the Challenge packets.

If the authentication is successful, the successful authentication is indicated from RADIUS server 92 through authenticator 91 to supplicant 90, and the reauthentication timer of authenticator 91 starts to count down. Authenticator 91 sends an encryption key to supplicant 90.

FIG. 4 of the accompanying drawings is a sequence diagram showing the reauthentication cycle of the conventional authentication system. FIG. 4 shows in detail the authentication process that is performed by the exchange of packets 907 through 913 shown in FIG. 2. As shown in FIG. 4, the authentication process is started by the EAP-Request(Identity) sent from authenticator 91 to supplicant 90 when the timer expires.

The reauthentication cycle is the same as the first authentication cycle. In the reauthentication cycle, Challenge packets are repeatedly sent from RADIUS server 92 to supplicant 90 and Message Digest packets are repeatedly sent from supplicant 90 to RADIUS server 92 as responses to the Challenge packets.

If the authentication is successful, a successful authentication message is sent from RADIUS server 92 through authenticator 91 to supplicant 90, and authenticator 91 resets and starts to count down the reauthentication timer. Authenticator 91 sends an encryption key to supplicant 90.

However, the conventional authentication system suffers the following problems:

Supplicant 90 may change from an ordinary operational state to a suspended state, a hibernated state, or a shutdown state depending on an operating action made by the user, how the user uses supplicant 90, or a charged state of the battery thereof.

The suspended state is a state in which a program being executed by supplicant 90 is temporarily suspended. The hibernated state is a state in which the data in a main memory is stored into a hard disk and supplicant 90 enters an energy-saving mode. The shutdown state is a state in which a program being executed by supplicant 90 is terminated and supplicant 90 is turned off. All of the suspended state, the hibernated state, and the shutdown state are collectively referred to as "aborted state".

There is a function known as Wake-on LAN (registered trademark) for resuming or activating a computer in the suspended state, the hibernated state, or the shutdown state through a network. Changing from the aborted state to the operational state, by way of resumption or activation, is collectively referred to as "wake-up".

FIG. 5 of the accompanying drawings is a view showing a general Wake-on LAN. As shown in FIG. 5, terminal 93 is connected to network 95 by LAN card 94, and terminal 96 is also connected to network 95.

It is assumed that terminal 93 is in the aborted state. Even though terminal 93 is in the aborted state, LAN card 94 remains energized and is linked to network 95 through a MAC layer. When LAN card 94 receives a wake-on packet, it wakes up terminal 93.

To wake up terminal 93, terminal 96 sends a wake-on packet through network 95 to LAN card 94. In response to the wake-on packet, LAN card 94 wakes up terminal 93.

The Wake-on LAN function is performed in the manner described above.

If supplicant 90 in the authentication system shown in FIG. 1 is in the aborted state, supplicant 90 is unable to receive packets from authenticator 91 until supplicant 90 is waked up. When the reauthentication timer expires, authenticator 91 starts an authentication cycle. However, since supplicant 90 cannot perform the authentication process, the authentication fails. As a result, the link that supplicant 90 has to the network is disconnected, and supplicant 90 cannot be waked up by another terminal (not shown) according to the Wake-on LAN function.

SUMMARY OF THE INVENTION

It is an object of the present invention to provide a communication system which employs an authentication system for repeating an authentication process at predetermined time intervals and which is capable of sending packets to a supplicant which is in an aborted state.

To achieve the above object, an authentication system according to the present invention repeatedly performs an authentication process each time a predetermined period of effective authentication elapses. The authentication system has a communication terminal and an authentication device. The communication terminal is connectable to a network when an authentication thereof is successful, changes between an operational state and an aborted state, and indicates a transition to the aborted state when the communication terminal changes from the operational state to the aborted state.

The authentication device repeatedly performs the authentication process, counts the predetermined period for the communication terminal when the authentication thereof is successful, and performs the authentication process again for the communication terminal if the predetermined period elapses. When the transition to the aborted state is indicated by the communication terminal, the authentication device stops counting the predetermined period for the communication terminal and keeps the authentication of the communication terminal in a previous authentication cycle effective.

When the communication terminal changes from the state in which the authentication thereof has been successful to the aborted state, the communication terminal indicates the transition to the aborted state to the authentication device, and the authentication device temporarily stops counting the predetermined period, or an authenticated period, for the communication terminal from which the transition to the aborted state is indicated. Therefore, the authenticated period of the communication terminal in the aborted state does not expire, and packets can be sent to the communication terminal.

The above and other objects, features, and advantages of the present invention will become apparent from the following description with reference to the accompanying drawings which illustrate an example of the present invention.

DETAILED DESCRIPTION OF THE PREFERRED EMBODIMENT

An authentication system according to an embodiment of the present invention will be described in detail below with reference to the accompanying drawings.

Figure 1:
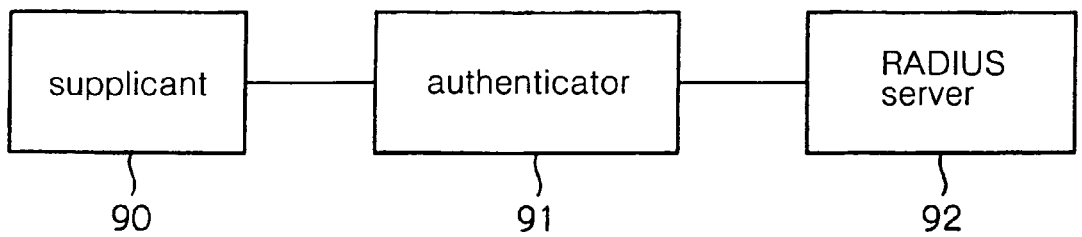
FIG. 1 is a block diagram of a conventional authentication system.
Figure 2:
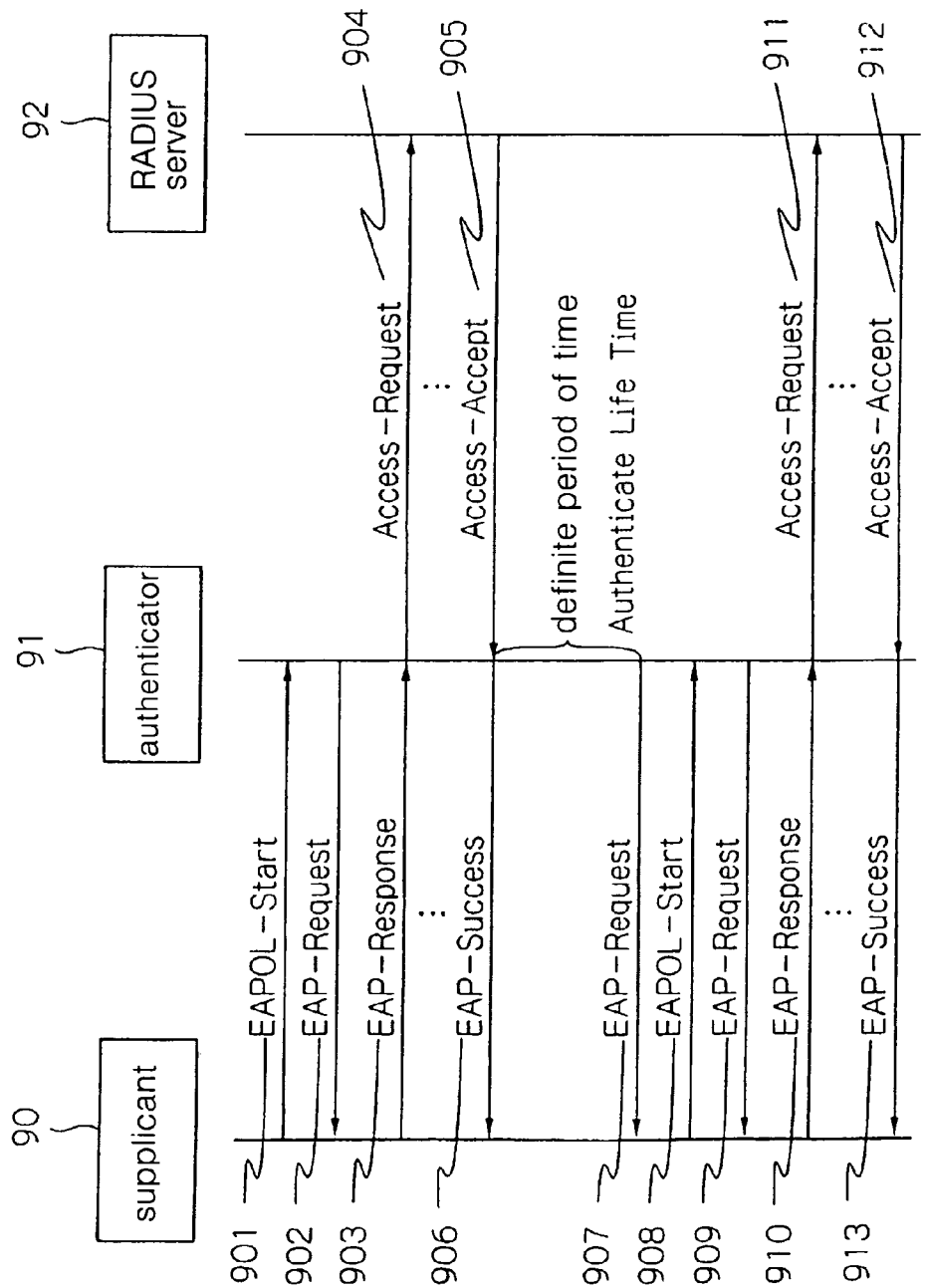
FIG. 2 is a sequence diagram of operation of the conventional authentication system.
Figure 3:
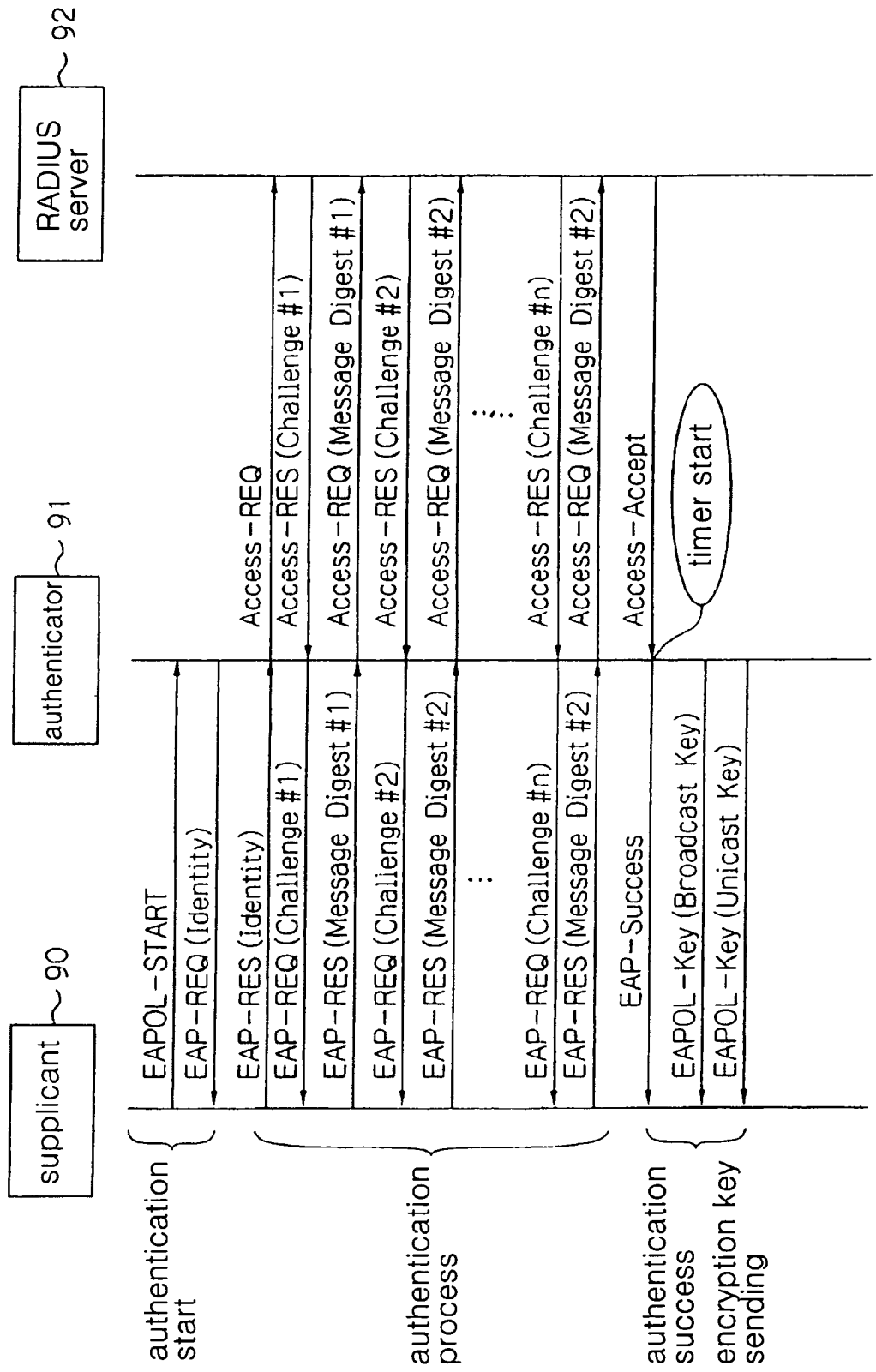
FIG. 3 is a sequence diagram showing a first authentication cycle of the conventional authentication system.
Figure 4:
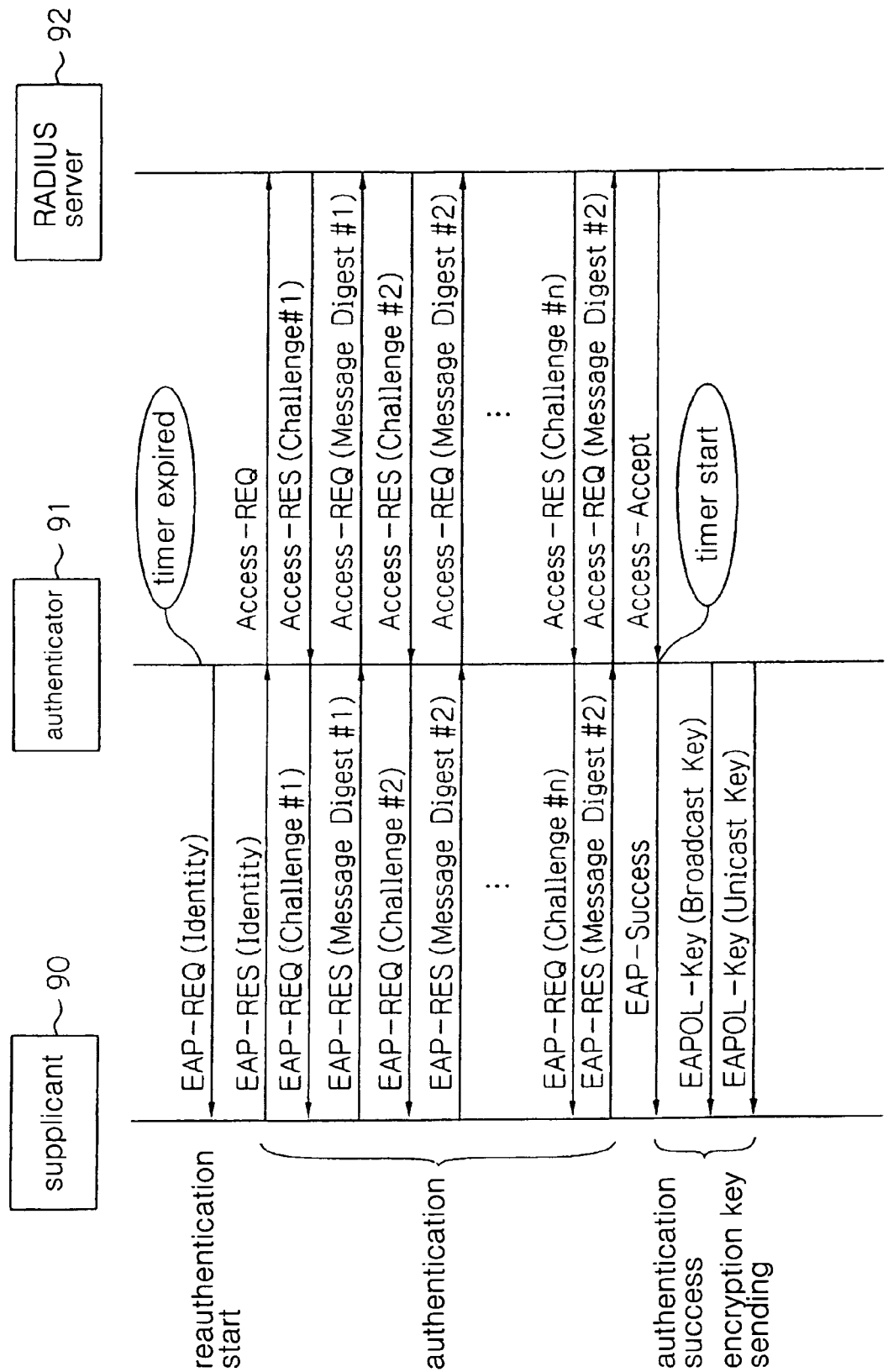
FIG. 4 is a sequence diagram showing a reauthentication cycle of the conventional authentication system.
Figure 5:
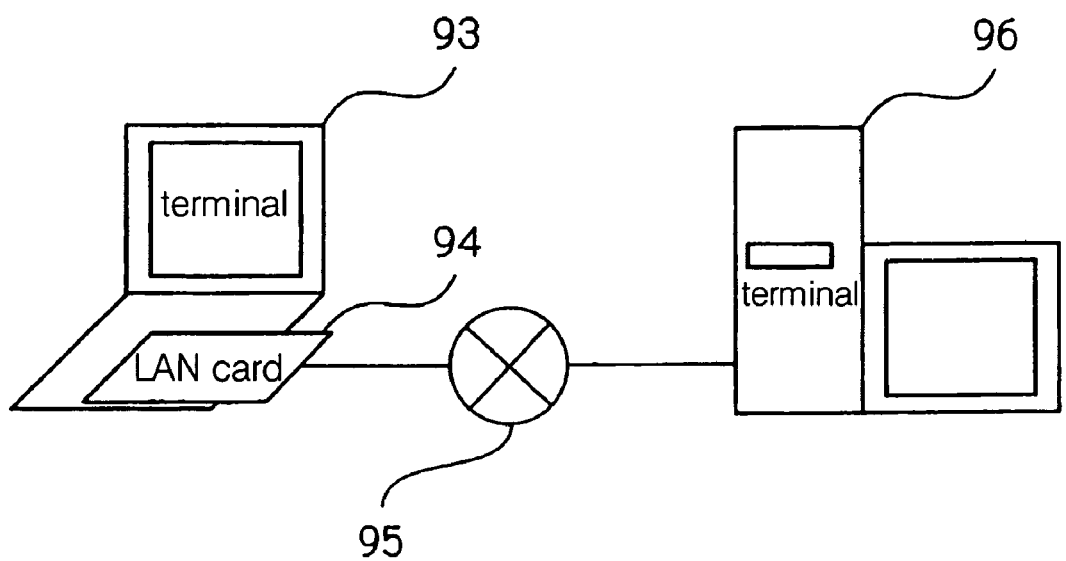
FIG. 5 is a view showing a general Wake-on LAN.
Figure 6:
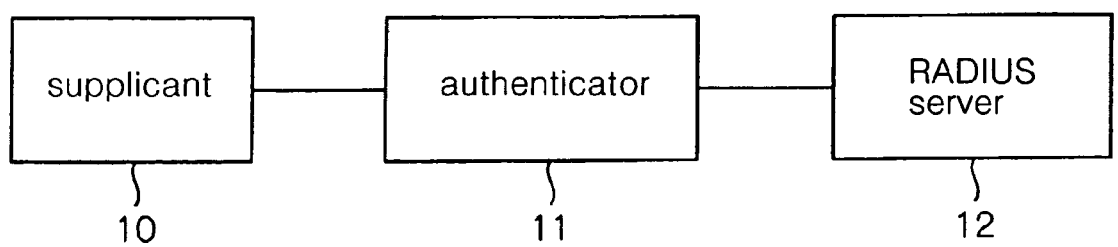
FIG. 6 is a block diagram of an authentication system according to an embodiment of the present invention.

FIG. 6 shows in block form an authentication system according to an embodiment of the present invention. As shown in FIG. 6, the authentication system has supplicant 10 and authenticator 11. Authenticator 11 can be connected to RADIUS server 12.

Supplicant 10 has a function to connect to a LAN, e.g., a LAN card, and comprises a user terminal capable of connecting to a network, e.g., a wireless LAN terminal. Supplicant 10 can connect to a network when it is authenticated by authenticator 11.

Supplicant 10 also has a function to change from an ordinary operational state to a suspended state, a hibernated state, or a shutdown state depending on an operating action made by the user, how the user uses supplicant 90, or a charged state of the battery thereof.

The suspended state is a state in which a program being executed by supplicant 10 is temporarily suspended. The hibernated state is a state in which the data in a main memory is stored into a hard disk and supplicant 10 enters an energy-saving mode. The shutdown state is a state in which a program being executed by supplicant 10 is terminated and supplicant 10 is turned off. All of the suspended state, the hibernated state, and the shutdown state are collectively referred to as "aborted state".

Supplicant 10 which is in the aborted state is resumed or activated by an instruction sent from another computer through a network. This is a function known as Wake-on LAN. Changing from the aborted state to the operational state, by way of resumption or activation, is collectively referred to as "wake-up". Once supplicant 10 is connected to a network based on a successful authentication, then even if supplicant 10 subsequently enters the aborted state, its function to connect to a LAN remains active, and supplicant 10 wakes up when it receives a wake-on packet.

When supplicant 10 is about to enter the aborted state, supplicant 10 notifies authenticator 11 of its being in the aborted state. The aborted state is indicated by a WOL-RDY packet. When supplicant 10 wakes up from the aborted state, it operates in the same manner as with the first authentication cycle.

Authenticator 11 is an authenticating device such as a wireless LAN access point, and authenticates supplicant 10 serving as a terminal. It is assumed that authenticator 11 uses a RADIUS protocol for authentication, and operates as a RADIUS client. When accessed by supplicant 10, authenticator 11 exchanges authentication information with RADIUS server 12. If the authentication is successful, then authenticator 11 sends a successful authentication message to supplicant 10.

An authentication has an authenticate life time. After supplicant 10 is authenticated, authenticator 11 authenticates supplicant 10 repeatedly at given time intervals. If, however, supplicant 10 is in the aborted state, then authenticator 11 stops counting down a timer for supplicant 10.

Therefore, authenticator 11 manages a reauthentication timer for measuring the elapse of an authenticated period and a WOL-RDY flag indicative of whether supplicant 10 is in the aborted state or not, with respect to the account of supplicant 10.

When authenticator 11 receives a WOL-RDY packet from supplicant 10, authenticator 11 sets the WOL-RDY flag of supplicant 10 to "1" representing the aborted state. When an authentication process is initiated from supplicant 10, authenticator 11 resets the WOL-RDY flag to "0" representing an unaborted state.

The reauthentication timer is a timer which expires when it counts down to zero a predetermined period of time representing an authenticated period. If the WOL-RDY flag is "1", then authenticator 11 stops counting down the reauthentication timer.

When the reauthentication timer expires, authenticator 11 starts an authentication process. Each time the authentication is successful, authenticator 11 resets the reauthentication timer.

RADIUS server 12 performs an authentication process for supplicant 10 according to a request from authenticator 11. RADIUS server 12 uses a RADIUS protocol for authentication. When RADIUS server 12 receives a request from authenticator 11 which is a RADIUS client, RADIUS server 12 exchanges authentication information with authenticator 11, and determines whether the authentication is successful or not.

Figure 7:
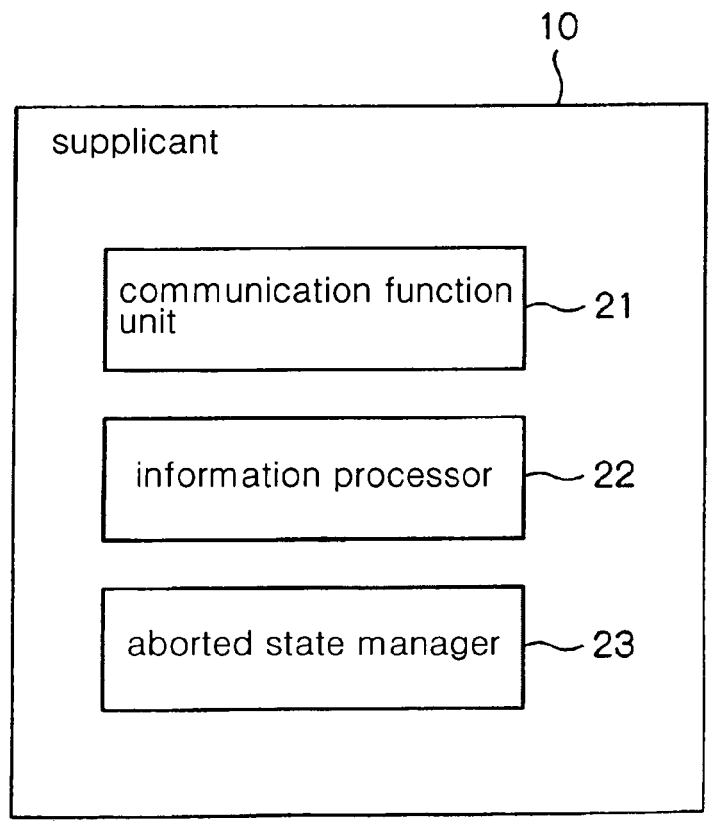
FIG. 7 is a block diagram of a supplicant of the authentication system shown in FIG. 6.

FIG. 7 shows in block form supplicant 10 of the authentication system shown in FIG. 6. As shown in FIG. 7, supplicant 10 has communication function unit 21, information processor 22, and aborted state manager 23.

Communication function unit 21 connects to a network and sends packets to and receives packets from the network. When communication function unit 21 receives a wake-on packet, communication function unit 21 instructs aborted state manager 23 to change to the operational state. Even when information processor 22 is in the aborted state, communication function unit 21 continues to operate and remains capable of receiving a wake-on packet.

Information processor 22 performs various information processing processes as desired by the user. When communication function unit 21 connects to a network, information processor 22 performs an authentication process in cooperation with authenticator 11. If there is an authentication request from authenticator 11, information processor 22 performs an authentication process again.

When supplicant 10 is aborted by aborted state manager 23, information processor 22 stops its information processing processes, and enters an aborted state such as a suspended state, a hibernated state, or a shutdown state. When information processor 22 enters the aborted state, it sends a WOL-RDY packet to authenticator 11, informing authenticator 11 of its being in the aborted state.

When information processor 22 is waked up from the aborted state by an instruction from aborted state manager 23, information processor 22 performs an authentication cycle which is the same as the first authentication cycle.

Aborted state manager 23 manages transitions between the operational state and the aborted state. Aborted state manager 23 determines whether supplicant 10 should be brought into the aborted state or not based on an operating action made by the user, how the user uses supplicant 10, or a charged state of the battery thereof. When aborted state manager 23 is informed of the reception of a wake-on packet by communication function unit 21, aborted state manager 23 cancels the aborted state, and wakes up information processor 22.

Figure 8:
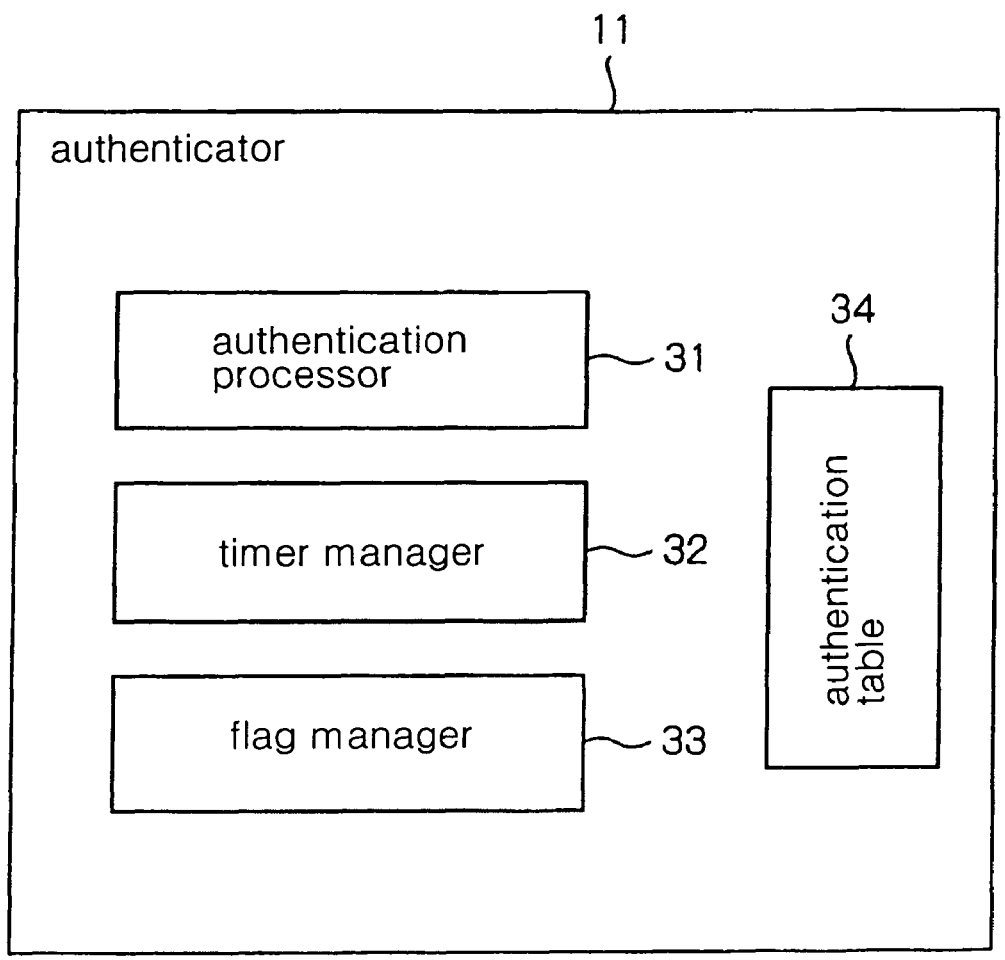
FIG. 8 is a block diagram of an authenticator of the authentication system shown in FIG. 6.

FIG. 8 shows in block form authenticator 11 of the authentication system shown in FIG. 6. As shown in FIG. 8, authenticator 11 has authentication processor 31, timer manager 32, flag manager 33, and authentication table 34.

Authentication processor 31 performs an authentication process in response to an authentication start request from supplicant 10 or an indication of timer expiration from timer manager 32. In the authentication process, authentication processor 31 exchanges authentication information with supplicant 10 and RADIUS server 12. A first authentication cycle is initiated by a request from supplicant 10. If the first authentication cycle is successful, then authentication processor 31 sets a WOL-FDY flag and a reauthentication timer for the account of supplicant 10. Supplicant 10, the WOL-FDY flag, and the reauthentication timer are associated with each other in authentication table 34. A subsequent authentication cycle is started by a notification from timer manager 32.

Timer manager 32 manages the counting of a reauthentication timer corresponding to the account of supplicant 10 whose first authentication cycle has been made successful by authentication processor 31. If the WOL-RDY flag of supplicant 10 is set to "1" (aborted state) by flag manager 33, then timer manager 32 temporarily stops counting down the reauthentication timer for supplicant 10. If the WOL-RDY flag of supplicant 10 is reset to "0" (unaborted state), then timer manager 32 resumes counting down the reauthentication timer for supplicant 10.

When the reauthentication timer expires, timer manager 32 informs authentication processor 31 of the timer expiration. If authentication processor 31 thus informed is successful in authenticating supplicant 10, then timer manager 33 resets the reauthentication timer for supplicant 10, and starts counting down the reauthentication timer from an initial timer value.

Flag manager 33 manages the WOL-RDY flag of supplicant 10 which has been successfully authenticated by authentication processor 31. Initially, the WOL-RDY flag is of a value "0". When flag manager 33 receives a WOL-RDY packet from supplicant 10, flag manager 33 sets the WOL-RDY flag to "1". When flag manager 33 is requested by supplicant 10 to start an authentication process, flag manager 33 sets the WOL-RDY flag to "0". A request to start an authentication process from supplicant 10 is determined based on an EAPOL (PPP Extensible Authentication Protocol over Local Area Networks)-Start packet.

Figure 9:
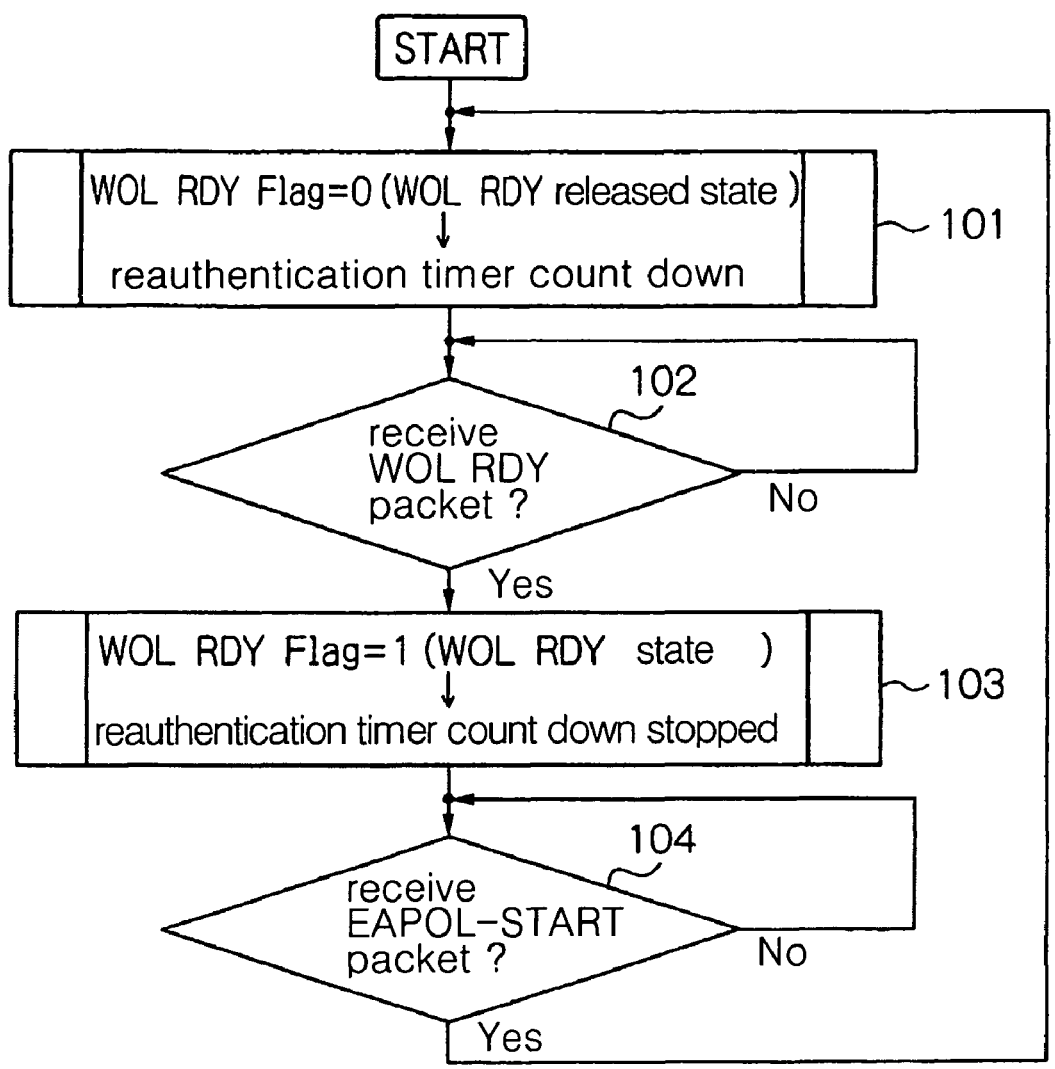
FIG. 9 is a flowchart of an operation sequence of the authenticator with respect to a WOL-RDY flag and a reauthentication timer.

FIG. 9 is a flowchart of an operation sequence of authenticator 11 with respect to the WOL-RDY flag and the reauthentication timer. As shown in FIG. 9, if authenticator 11 is successful in a first authentication cycle, then authenticator 11 resets the WOL-RDY flag to the initial value of "0", starting to count down the reauthentication timer in step 101.

Then, authenticator 11 determines whether it has received a WOL-RDY packet from supplicant 10 or not in step 102. If authenticator 11 has not received a WOL-RDY packet, then authenticator 11 repeats step 102.

If authenticator 11 has received a WOL-RDY packet, then authenticator 11 sets the WOL-RDY flag to "1" and temporarily stops counting down the reauthentication timer in step 103. Then, authenticator 11 determines whether it has received an EAPOL-Start packet from supplicant 10 or not in step 104. If authenticator 11 has not received an EAPOL-Start packet, then authenticator 11 repeats step 104.

If authenticator 11 has received an EAPOL-Start packet, then authenticator 11 performs an authentication cycle which is the same as the first authentication cycle. Control goes back to step S101, resetting the WOL-RDY flag to "0" and starting to count down the reauthentication timer.

Operation of the authentication system according to the present embodiment will be described below.

Figure 10:
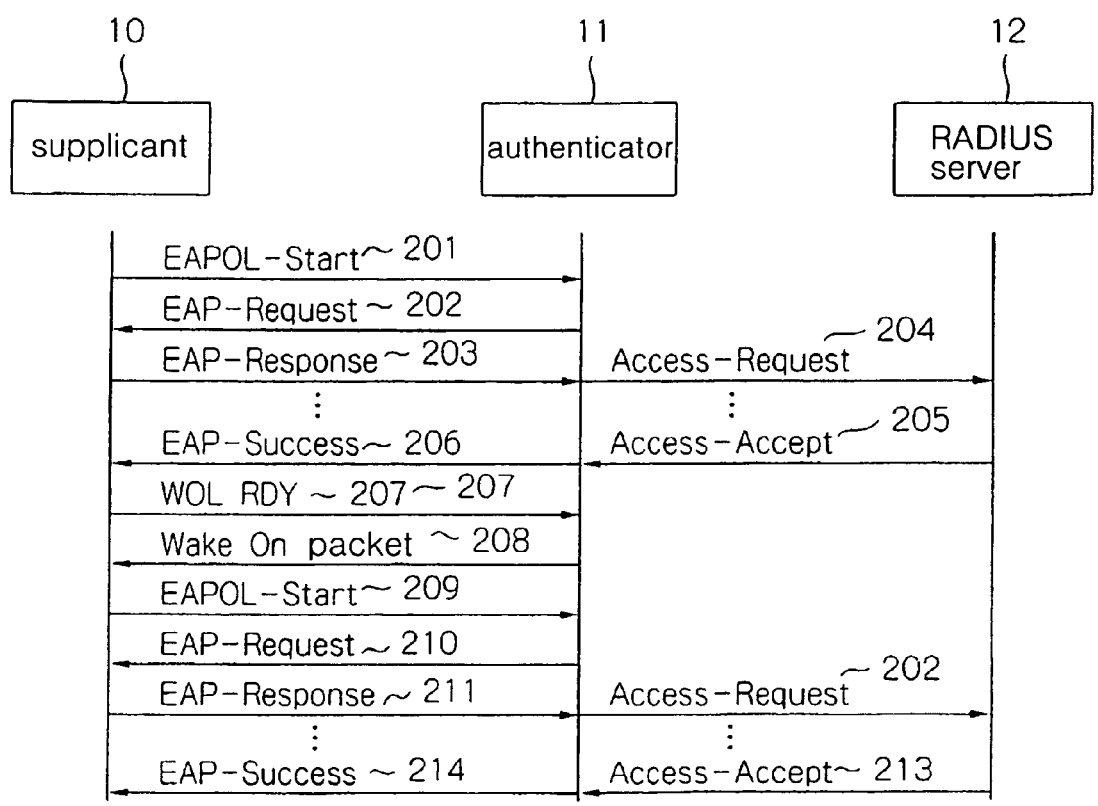
FIG. 10 is a sequence diagram of operation of the authentication system according to the embodiment of the present invention.

FIG. 10 is a sequence diagram of operation of the authentication system according to the embodiment of the present invention. As shown in FIG. 10, supplicant 10 sends EAPOL-Start packet 201 to authenticator 11 in a first authentication cycle.

When authenticator 11 receives EAPOL-Start packet 201, authenticator 11 starts an authentication process, and sends EAP-Request packet 202 to supplicant 10. In response to EAP-Request packet 202, supplicant 10 sends EAP-response packet 203 to authenticator 11.

When authenticator 11 receives EAP-Response packet 203, authenticator 11 sends Access-Request packet 204 to RADIUS server 12, requesting RADIUS server 12 to authenticate supplicant 10. If the authentication subsequently proves to be successful through an authentication sequence, then RADIUS server 12 sends Access-Accept packet 205 indicative of the successful authentication to the authenticator 11.

When authenticator 11 receives Access-Accept packet 205, authenticator 11 sends EAP-Success packet 206 to supplicant 10, informing supplicant 10 of the successful authentication. Now, supplicant 10 can be connected to a network through authenticator 11.

At this time, authenticator 11 registers the account of supplicant 10 in internal authentication table 34, and starts counting down the reauthentication timer corresponding to the account.

It is assumed that supplicant 10 enters the aborted state at this time. When supplicant 10 enters the aborted state, supplicant 10 sends WOL-RDY packet 207 to authenticator 11. WOL-RDY packet 207 includes identification information for identifying the account of supplicant 10. When authenticator 11 receives WOL-RDY packet 207, authenticator 11 sets a WOL-RDY flag of supplicant 10 which has been identified based on the identification information, to "1", and temporarily stops counting down the reauthentication timer. Therefore, the authenticated period does not expire while supplicant 10 is in the aborted state.

It is assumed that supplicant 10 is subsequently waked up according to the Wake-on LAN function by another computer (not shown) on a network (not shown). Since the authenticated period has not expired, wake-on packet 208 from the other computer reaches supplicant 10 through authenticator 11.

When supplicant 10 receives wake-on packet 208, supplicant 10 is waked up into the operational state, and sends EAPOL-Start packet 209 to authenticator 11 as in the first authentication cycle. when authenticator 11 receives EAPOL-Start packet 209, authenticator 11 recognizes the cancellation of the aborted state, resets the WOL-RDY flag to "0", and resumes counting down the reauthentication timer.

Authenticator 11 starts performing an authentication cycle which is the same as the first authentication cycle, and sends EAP-Request packet 210 to supplicant 10. When supplicant 10 receives EAP-Request packet 210, supplicant 10 sends EAP-response packet 211 to authenticator 11.

When authenticator 11 receives EAP-Response packet 211, authenticator 11 sends Access-Request packet 212 to RADIUS server 12, requesting RADIUS server 12 to authenticate supplicant 10. If the authentication subsequently proves to be successful through an authentication sequence, then RADIUS server 12 sends Access-Accept packet 213 indicative of the successful authentication to the authenticator 11.

When authenticator 11 receives Access-Accept packet 213, authenticator 11 sends EAP-Success packet 214 to supplicant 10, informing supplicant 10 of the successful authentication. Now, supplicant 10 can be connected to a network through authenticator 11.

Figure 11:
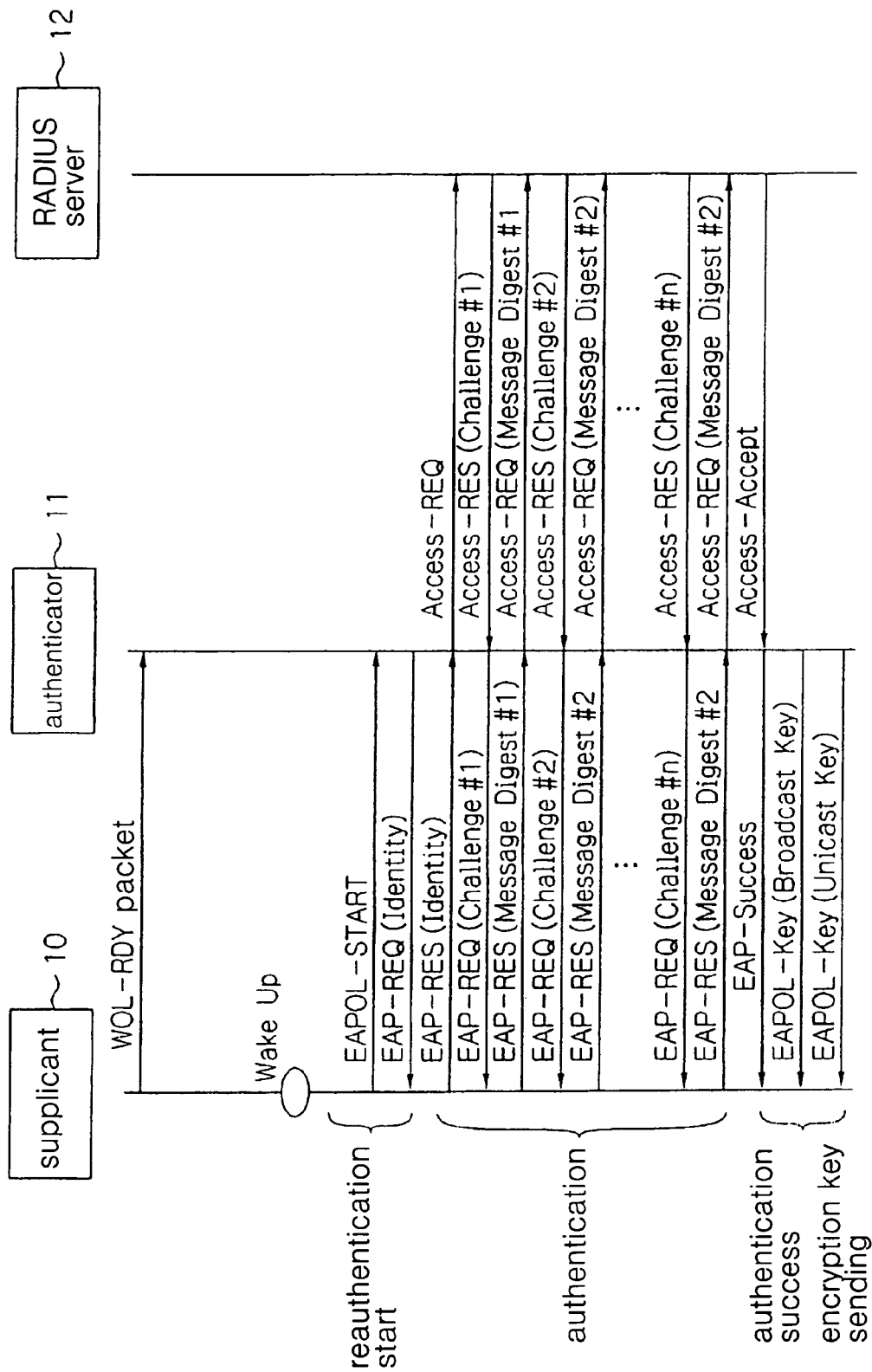
FIG. 11 is a sequence diagram of a sequence from an aborted state to a successful authentication in the authentication system according to the embodiment of the present invention.

FIG. 11 is a sequence diagram of a sequence from the aborted state to the successful authentication in the authentication system according to the embodiment of the present invention. FIG. 11 shows in detail the authentication process that is performed by the exchange of packets 207 through 213 shown in FIG. 10. As shown in FIG. 11, when supplicant 10 enters the aborted state, supplicant 10 sends a WOL-RDY packet to authenticator 11, which then temporarily stops counting down the reauthentication timer. Thereafter, supplicant 10 is waked up by the occurrence of a certain event such as the reception of a wake-up packet or the like, and sends an EAPOL-Start packet to authenticator 11.

The authentication process is started by the EAPOL-Start packet sent from supplicant 10 to authenticator 11 and the EAP-Request(Identity) sent from authenticator 11 to supplicant 10.

In the authentication process, Challenge packets are repeatedly sent from RADIUS server 12 to supplicant 10 and Message Digest packets are repeatedly sent from supplicant 10 to RADIUS server 12 as responses to the Challenge packets.

If the authentication is successful, the successful authentication is indicated from RADIUS server 12 through authenticator 11 to supplicant 10, and the reauthentication timer of authenticator 11 starts to count down. Authenticator 11 sends an encryption key to supplicant 10.

With the authentication system according to the present embodiment, as described above, when supplicant 10 changes from the state in which the authentication is successful and supplicant 10 is connected to the network to the aborted state, supplicant 10 indicates the state transition to authenticator 11 with a WOL-RDY packet. Authenticator 11 temporarily stops counting down the authenticated period for supplicant 10 from which the transition to the aborted state has been indicated. When there is an authentication request from supplicant 10 by way of an EAPOL-Start packet, authenticator 11 performs an authentication process. If the authentication is successful, then authenticator 11 starts to count down the authenticated period of supplicant 10 from an initial value. Consequently, the authenticated period of supplicant 10 that is in the aborted state does not expire, and another computer can send packets to supplicant 10 in the aborted state through the network.

Furthermore, another computer can send a wake-on packet to supplicant 10 in the aborted state to wake up supplicant 10.

While a preferred embodiment of the present invention has been described using specific terms, such description is for illustrative purposes only, and it is to be understood that changes and variations may be made without departing from the spirit or scope of the following claims.

What is claimed is:

1. An authentication system for repeatedly performing an authentication process, each time a predetermined period of effective authentication elapses, comprising:
   a communication terminal for being connectable to a network when an authentication thereof is successful, changing between an operational state and an aborted state, and indicating a transition to said aborted state when the communication terminal changes from said operational state to said aborted state; and
   an authentication device for repeatedly performing the authentication process, counting said predetermined period for the communication terminal when the authentication thereof is successful, and performing the authentication process again for the communication terminal if said predetermined period elapses, wherein when the transition to said aborted state is indicated by said communication terminal, said authentication device stops counting a remaining part of said predetermined period corresponding to a remaining authentication effective period for the communication terminal, and keeps the authentication of the communication terminal in a previous authentication cycle effective;
   wherein said aborted state is a state in which said communication terminal connects to said network and remains capable of receiving a packet although said communication terminal stops various information processing processes as desired by a user;
   said communication terminal changes to said operational state and sends an authentication request to said authentication device if there is an instruction from another device through said network while said communication terminal is in said aborted state,
   said authentication device recognizes that said communication terminal changes to said operational state when there is an authentication request from said communication terminal and resumes counting said predetermined period.

2. An authentication system according to claim 1, wherein said authentication device performs the authentication process on said communication terminal which has changed to said operational state, and, if the authentication thereof is successful, starts counting said predetermined period from an initial value thereof for said communication terminal.

3. An authentication system according to claim 1, wherein said authentication device has a flag indicating whether the communication terminal is in the aborted state or not and a timer for counting said predetermined period, with respect to the account of the communication terminal whose authentication has been successful, and wherein said authentication device sets said flag when said communication terminal changes to said aborted state, resets said flag when said communication terminal changes to said operational state, and stops said timer while said flag is being set.

4. An authentication system according to claim 1, wherein said communication terminal comprises:
   an aborted state manager that manages transitions between the operational state and the aborted state;
   an information processor that stops an information processing process when instructed by said aborted state manager that said communication terminal is to go into the aborted state,
   wherein said information processor outputs a signal to said authentication device indicating the transition to said aborted state.

5. An authentication system according to claim 1, wherein the instruction from said another device while said communication terminal is in said aborted state that causes said communication terminal to enter the operation state is a wake-on packet sent over the network from said another device to said communication terminal.

6. An authentication system according to claim 1, wherein said authentication device stops counting the remaining part of said predetermined period corresponding to the remaining authentication effective period for the communication terminal irrespective as to whether the communication terminal is or is not connected to the network.

7. An authentication device for repeatedly performing an authentication process on a communication terminal each time a predetermined period of effective authentication elapses, comprising:
- a flag manager for managing whether the communication terminal whose authentication has been successful is in an operational state or an aborted state;
- a timer manager for counting said predetermined period for the communication terminal, and stops counting a remaining part of said predetermined period corresponding to a remaining authentication effective period for said communication terminal while said communication terminal is in the aborted state as determined by said flag manager; and
- an authentication processor for performing the authentication process in response to a request from said communication terminal or the elapse of said predetermined period in said timer manager, and keeping the authentication effective for the communication terminal whose authentication has been successful until said predetermined period expires as determined by said timer manager;
- wherein said aborted state is a state in which said communication terminal connects to a network and remains capable of receiving a packet although said communication terminal stops various information processing processes as desired by a user;
- said communication terminal changes to said operational state and sends a request to said authentication device if there is an instruction from another device through said network while said communication terminal is in said aborted state,
- said time manager recognizes that said communication terminal changes to said operational state when there is a request from said communication terminal and resumes counting said predetermined period.

8. An authentication device according to claim 7, wherein said timer manager resumes counting said predetermined period when said communication terminal changes to said operational state after said predetermined period for the communication terminal stops being counted.

9. An authentication device according to claim 7, wherein said timer manager stops counting the remaining part of said predetermined period corresponding to the remaining authentication effective period for said communication terminal irrespective as to whether the communication terminal is or is not connected to a network.

10. A method, performed by a computer, of authentication in a system for repeatedly performing an authentication process on a communication terminal each time a predetermined period of effective authentication elapses, comprising the steps of:
- starting counting, by said computer, said predetermined period for the communication terminal whose authentication has been successful;
- stopping counting, by said computer, a remaining part of said predetermined period corresponding to a remaining authentication effective period for said communication terminal and keeping the authentication effective for said communication terminal while said communication terminal is in an aborted state; and
- performing, by said computer, said authentication process again on said communication terminal when said predetermined period elapses;
- wherein said aborted state is a state in which said communication terminal connects to a network and remains capable of receiving a packet although said communication terminal stops various information processing processes as desired by a user;
- said communication terminal changes to an operational state and sends a request to said computer if there is an instruction from another device through said network while said communication terminal is in said aborted state,
- said starting step recognizes that said communication terminal changes to said operational state when there is a request from said communication terminal and resumes counting said predetermined period.

11. A method according to claim 10, wherein the stopping step stops counting the remaining part of said predetermined period corresponding to the remaining authentication effective period for said communication terminal irrespective as to whether the communication terminal is or is not connected to a network.

12. A non-transitory computer readable medium storing a program for operating a computer as an authentication device for repeatedly performing an authentication process on a communication terminal each time a predetermined period of effective authentication elapses, said program controlling said computer to perform a process comprising the steps of:
- starting counting said predetermined period for the communication terminal whose authentication has been successful;
- stopping counting a remaining part of said predetermined period corresponding to a remaining authentication effective period for said communication terminal and keeping the authentication effective for said communication terminal while said communication terminal is in an aborted state; and
- performing said authentication process again on said communication terminal when said predetermined period elapses;
- wherein said aborted state is a state in which said communication terminal connects to a network and remains capable of receiving a packet although said communication terminal stops various information processing processes as desired by a user;
- said communication terminal changes to an operational state and sends a request to said authentication device if there is an instruction from another device through said network while said communication terminal is in said aborted state,
- said starting step recognizes that said communication terminal changes to said operational state when there is a request from said communication terminal and resumes counting said predetermined period.

13. A non-transitory computer readable medium according to claim 12, wherein the stopping step stops counting the remaining part of said predetermined period corresponding to the remaining authentication effective period for said communication terminal irrespective as to whether the communication terminal is or is not connected to a network.

14. A communication terminal for being repeatedly authenticated each time a predetermined period of effective authentication elapses, comprising:
- an aborted state manager for managing whether the communication terminal is to be in an operational state or an aborted state;
- an information processor for processing information when the communication terminal is held in the operational state by said aborted state manager, and indicating a transition to said aborted state to an authentication device when the communication terminal changes from said operational state to said aborted state so that said authentication device does not perform a new authentication at the end of a current predetermined period but rather maintains the communication terminal at a most recent authentication state for the communication terminal; and a communication function unit for sending and receiving packets while the communication terminal is held in the aborted state by said aborted state manager, and instructing said aborted state manager to bring the communication terminal into the operational state when the communication function unit receives a packet indicative of a transition to the operational state;

wherein said aborted state is a state in which said communication function unit connects to a network and remains capable of receiving a packet although said information processor stops various information processing processes as desired by a user;

said information processor changes to said operational state and sends a request to said authentication device if there is an instruction from another device through said network while said communication terminal is in said aborted state, said authentication device for repeatedly performing the authentication process, counting said predetermined period for the communication terminal when the authentication thereof is successful, and performing the authentication process again for the communication terminal if said predetermined period elapses, wherein when the transition to said aborted states is indicted by said communication terminal, said authentication device stops counting a remaining part of said predetermine period corresponding to a remaining authentication effective period for the communication terminal, and keeps the authentication of the communication terminal in a previous authentication cycle effective, recognizing that said communication terminal changes to said operational state when there is an authentication request from said communication terminal and resumes counting said predetermined period.

* * * * *